(12) United States Patent
Cummings et al.

(10) Patent No.: US 7,831,502 B2
(45) Date of Patent: *Nov. 9, 2010

(54) OVER THE COUNTER TRADED PRODUCT AND SYSTEM FOR OFFSET AND CONTINGENT TRADING OF COMMODITY CONTRACTS

(75) Inventors: Raymond James Cummings, Decatur, GA (US); Marc Leppard, Sanderstead (GB)

(73) Assignee: IntercontinentalExchange, Inc., Atlanta, GA (US)

(*) Notice: Subject to any disclaimer, the term of this patent is extended or adjusted under 35 U.S.C. 154(b) by 460 days.

This patent is subject to a terminal disclaimer.

(21) Appl. No.: 11/877,746

(22) Filed: Oct. 24, 2007

(65) Prior Publication Data

US 2008/0270284 A1 Oct. 30, 2008

Related U.S. Application Data

(63) Continuation of application No. 11/418,962, filed on May 5, 2006, now Pat. No. 7,539,643.

(60) Provisional application No. 60/678,624, filed on May 6, 2005.

(51) Int. Cl.
*G06Q 40/00* (2006.01)

(52) U.S. Cl. .......................... 705/37; 705/35; 705/36 R (58) Field of Classification Search ....................... None
See application file for complete search history.

(56) References Cited

U.S. PATENT DOCUMENTS

| 7,039,610 | B2 * | 5/2006 | Morano et al. | 705/37 |
| 7,440,917 | B2 * | 10/2008 | Farrell et al. | 705/36 R |
| 7,512,557 | B1 * | 3/2009 | Fishbain et al. | 705/36 R |
| 7,523,064 | B2 * | 4/2009 | Burns et al. | 705/37 |
| 7,539,638 | B1 * | 5/2009 | Keith | 705/37 |
| 2001/0034688 | A1 * | 10/2001 | Annunziata | 705/37 |

(Continued)

OTHER PUBLICATIONS

"Exchanging" OTC Contracts, Securities Industry News, Mar. 1, 2004, 3 pages.*

(Continued)

*Primary Examiner*—Hani Kazimi
*Assistant Examiner*—Gregory Johnson
(74) *Attorney, Agent, or Firm*—DLA Piper LLP (US)

(57) ABSTRACT

A method for facilitating the offset or contingent trading of commodity contracts comprising: providing a futures exchange wherein a futures or option contract based on a first commodity of a commodity type is traded; and automatically registering a trade of the futures or options contract on the futures exchange at a market price for the futures or options contract when an over the counter contract for a second commodity of the commodity type is traded. In certain embodiments, the invention is an over the counter product comprising: a first leg comprising a purchase or sale of a futures contract based on a first commodity; and a second leg comprising a sale or purchase of an over the counter contract based on a second commodity; wherein the first commodity and the second commodity are of the same commodity type and the over the counter traded product trades at a price differential between the two legs; and wherein the purchase or sale of the futures or options contract is automatically registered on a futures exchange when the sale or purchase of the over the counter contract occurs. A system for offset or contingent trading of commodity contracts is also disclosed.

21 Claims, 4 Drawing Sheets

U.S. PATENT DOCUMENTS

| | | | |
|---|---|---|---|
| 2001/0049649 A1* | 12/2001 | Baecker et al. | 705/37 |
| 2002/0026403 A1* | 2/2002 | Tambay et al. | 705/37 |
| 2002/0038276 A1* | 3/2002 | Buhannic et al. | 705/37 |
| 2005/0080703 A1* | 4/2005 | Chiesa et al. | 705/36 |
| 2005/0091145 A1* | 4/2005 | Baker et al. | 705/37 |
| 2005/0283422 A1* | 12/2005 | Myr | 705/37 |
| 2006/0059064 A1* | 3/2006 | Glinberg et al. | 705/35 |
| 2006/0106707 A1* | 5/2006 | Shetty et al. | 705/37 |
| 2006/0218071 A1* | 9/2006 | Sweeting | 705/37 |
| 2006/0224491 A1* | 10/2006 | Pinkava | 705/37 |
| 2006/0253369 A1* | 11/2006 | O'Callahan | 705/37 |

OTHER PUBLICATIONS

Information technology insights: Online trading of chemicals in the post-Enron Environment, Bo Glasgow, Chemical Market Reporter; May 27, 2002; 261, 21; 3 pages.*

NYMEX OTC clearing: A viable solution for pricing, Electric Light & Power, v81, n5, May 2003, 4 pages.*

Clearing new front in ICE/Nymex feud, Daniel P Collins, Futures; Mar. 2003; 32, 4; 2 pages.*

* cited by examiner

Buy 500 lot Brent/Dubai EFS at price differential $6.50.

220

Buy 500 lots of November Brent futures at prevailing market price. Sell 500 lots of November Dubai swap at Brent futures price less EFS price.

230

Automatically transmit OTC position in Brent Crude oil to futures exchange as a 500 lot Brent future EFS.

240

Details of Trade (excluding price) publicized to the futures marketplace and on all trading screens.

> Sell a 300 lot Brent/BFO EFP at a price differential of $1.00.

320

> Sell 300 lot Brent crude oil futures at prevailing market price. Buy 300 lots BFO forward at Brent futures price less EFP price.

330

> Automatically transmit OTC position in Brent crude oil to futures exchange as a 300 lot Brent future EFP.

Buy 500 lot WTI/Mars contingent EFP at price differential $0.10.

↓

420

Buy 500 lots of November WTI futures at prevailing market price plus contingent EFP price.

↓

430

Automatically transmit OTC position in WTI crude oil to futures exchange as a 500 lot WTI future EFP.

↓

440

Details of Trade (excluding price) publicized to futures marketplace and on all trading screens.

OVER THE COUNTER TRADED PRODUCT AND SYSTEM FOR OFFSET AND CONTINGENT TRADING OF COMMODITY CONTRACTS

RELATED APPLICATIONS

This application is a continuation of U.S. patent application Ser. No. 11/418,962 filed May 5, 2006, which claims priority from U.S. Provisional Application No. 60/678,624 filed May 6, 2005, the contents of which are hereby incorporated by reference.

FIELD OF THE INVENTION

The present invention relates to an over the counter traded product and a system of offset or contingent trading of instruments which links an OTC marketplace with a futures exchange via an electronic interface. Particularly, the present invention is directed to a system wherein one contract is automatically exchanged for another contract on a related commodity.

DESCRIPTION OF RELATED ART

Trading of financial derivatives contracts (e.g., futures, options on futures, forwards, swaps, options on swaps, etc.) for physical commodities, natural resources and financial instruments (all generally referred to as commodities) is common in both the over-the-counter ("OTC") and the futures markets. Many of the commodities traded in an OTC market have similar corresponding futures or options contracts traded on futures exchanges. This is for the simple reason that there is a pricing relationship between the futures contract, the underlying asset on which it is based, and a related OTC derivative. This is particularly the case in crude oil markets where there is a price relationship between the physical wet crude oil and related derivatives. For example, Brent futures, which trade on, for example, the ICE Futures ("ICE Futures") is linked to a 21 day Brent, Forties and Oseburg ("BFO") forward contract which then turns into Dated Brent, as traded on, for example, the IntercontintentalExchange, Inc. ("ICE"). Also because of the linkages between different crudes, there are pricing relationships between different types of crude oil—e.g., there is a price correlation between U.S. West Texas Intermediate and the North Sea Brent crude oils, and between North Sea Brent crude oils and other oil markets, such as Dubai.

Besides the difference in the type of contract, regulatory supervision, and trading method (open out-cry, voice brokered, auction, electronic, etc.), OTC markets and futures markets differ in that futures markets are typically anonymous and always clear trades through a central counterparty, whereas OTC markets may be traded on a bilateral or cleared basis. This difference is often significant because bilaterally settled transactions require that the counterparties (e.g., buyers and sellers) accept each other's credit worthiness in relation to contract performance, whereas in a cleared market, the clearing firm manages collateral for contract performance on behalf of the counterparties. From a purely performance risk perspective (e.g., payment/collection or delivery/receipt of the asset), cleared contracts are typically preferred, especially where counterparties are largely unfamiliar with each other. In addition, there may be more liquidity in a particular contract on a particular base commodity (e.g., crude oil, natural gas, electricity, etc.) in either an OTC or futures market, and the investor or principal would typically rather trade in a market having more liquidity because it gives wider access to price discovery, potential counterparties, market information, quantities, and for contracts requiring physical delivery, delivery dates. In addition, in markets that are less liquid, there are potentially fewer counterparties with whom to trade, and the possibility that counterparties will be unacceptable from a contract performance, and consequently risk perspective, is increased. Alternatively, investors or principals that manage open positions up to and throughout the delivery process may prefer the guaranteed contract performance that clearing provides for a derivative prior to delivery, but upon fulfilling the terms of the contract, may choose the selectivity that the OTC markets provide in terms of potential counterparties and the potential synergies that non-anonymous delivery offer.

To take advantage of the OTC market and the futures markets trading in similar base commodities, a manual process of initiating and offsetting open positions from one method of contract performance to another is currently the norm—usually by completing a form provided by the exchange, and then submitting to the relevant exchange (via phone, fax, online, etc.). For example, suppose a party holds a long position in a relatively illiquid OTC commodity, such as a Dubai crude oil swap, which is a derivative contract based on a particular type of oil. The party wishes to convert that Dubai swap position into a position in a more liquid commodity, or a cleared commodity (because it no longer wishes to maintain contract performance risk for its counterparty to the trade). In this case, the party could convert the Dubai swap to a futures contract in Brent, which is another derivative of an oil commodity that typically trades at a price level, or differential, with respect to the Dubai crude oil.

According to the prior art, the counterparties would consummate an offsetting or contingent trade for the Dubai swap in the OTC market, then manually contact a clearing firm to submit the corresponding futures contract for registration on a futures exchange. The clearing firm submits a trade as an "exchange for physical" (EFP) or "exchange for swap" (EFS), depending on the settlement type of contract being switched into or out of, and the futures exchange matches the two sides and advertises the off-exchange trade to the futures market to notify that an EFP or EFS has taken place. The futures exchange may request documentation from the counterparties as evidence to the corresponding OTC trade to ensure that there has been no abuse under the futures exchange rules. This method works, but is inefficient. It also leads to potential risk in that there is risk of human error in agreeing to the terms of the trade, confirming with other counterparties, and completing a form for the relevant exchange. There is also a risk that the relevant exchange may refuse to accept the trade (typically because it either does not reflect market value, or for other regulatory reasons).

What is needed to make the process more efficient and to provide effective risk management and straight-through processing for counterparties and reduce operational risk is an automated EFS or EFP process that links an electronic OTC market and an electronic futures exchange and automatically generates an exchange futures position. A further need is a system which provides near real-time audit and market supervision capabilities for futures exchanges. Another need is a system that reduces operational risk for counterparties and provides near immediate straight-through processing into back office and risk management systems. Another need is a system that provides enhanced transparency for the exchanges for EFPs and EFSs.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

According to a preferred embodiment, one example of the invention is a method for facilitating the offset or contingent trading of commodity contracts comprising: providing a futures exchange wherein a futures or options contract based on a first commodity of a commodity type is traded; and automatically registering a trade of the futures or options contract on the futures exchange at the relevant market price for the futures or options contract when an over the counter contract for a second commodity of the commodity type is traded.

An alternative embodiment of the invention is an over the counter product comprising: a first leg comprising a purchase or sale of a futures or options contract based on a first commodity; and a second leg comprising a sale or purchase of an over the counter contract based on a second commodity; wherein the first commodity and the second commodity are of the same commodity type and the over the counter traded product trades at a price differential between the two legs; and wherein the purchase or sale of the futures or options contract is automatically registered on a futures exchange when the sale or purchase of the over the counter contract occurs. A system for offset or contingent trading of commodity contracts is also disclosed.

Yet a further embodiment of the invention is a system for offset or contingent trading of commodity contracts comprising: an over the counter contract settled bilaterally; a futures or options contract cleared through a clearinghouse; and a price differential between the over the contract and the futures or options contract; wherein the futures or options contract is a derivative for a first commodity of a commodity type, and the over the counter contract is a derivative for a second commodity of the commodity type; wherein upon execution of a trade of the over the counter contract, a trade of the futures or options contract representing similar/equivalent quantities of the over the counter contract is automatically registered on a futures exchange.

It is to be understood that both the foregoing general description and the following detailed description are exemplary and are intended to provide further explanation of the invention claimed.

DETAILED DESCRIPTION OF THE PREFERRED EMBODIMENT

Reference will now be made in detail to the present preferred embodiments of the invention. The method and corresponding steps of the invention will be described in conjunction with the detailed description of the system.

The methods and systems presented herein may be used for taking a bilateral OTC contract and moving into a cleared position, or taking a cleared contract and moving into a bilateral OTC position, or simultaneously initiating a position in both a bilateral OTC contract and a cleared contract. For purpose of explanation and illustration, and not limitation, exemplary embodiments are described herein.

Figure 1:
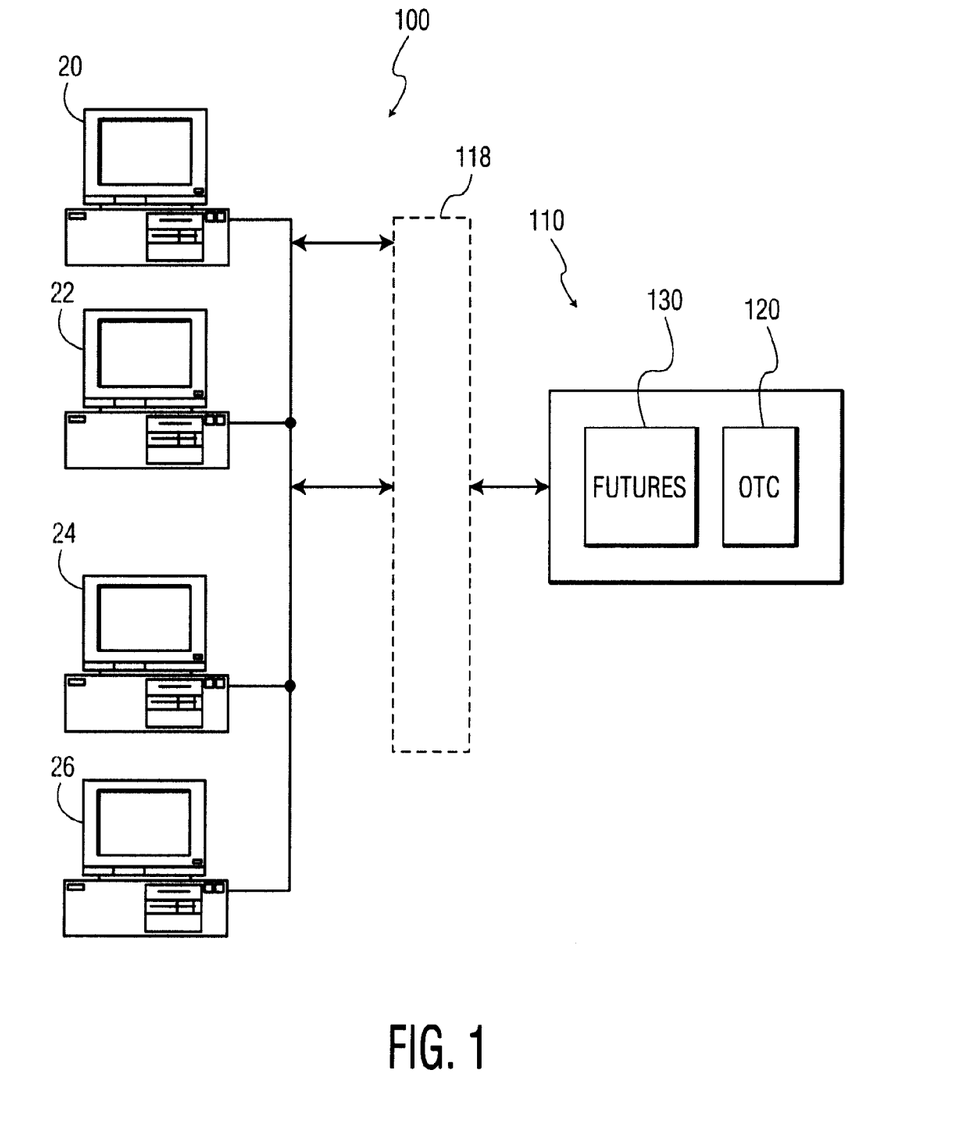
FIG. 1 is a block diagram of a computer system for electronic trades of financial products.

The present invention is carried out in an electronic trading environment, such as that provided by ICE. According to the preferred embodiments, the trading environment 100, depicted in FIG. 1, is comprised of a trading platform 110 which receives price feeds from an over the counter electronic exchange 120 and a futures exchange 130. Trades occurring on either the OTC exchange or the futures exchange are reported to the trading platform 110 so that a user has access to a single platform for trading both OTC and futures or options contracts. Individual users 20, 22, 24, and 26 are electronically linked to the trading platform 110 via a network, such as the internet, 118.

The following examples demonstrate aspects of the present invention.

EXAMPLE 1

Figure 2:
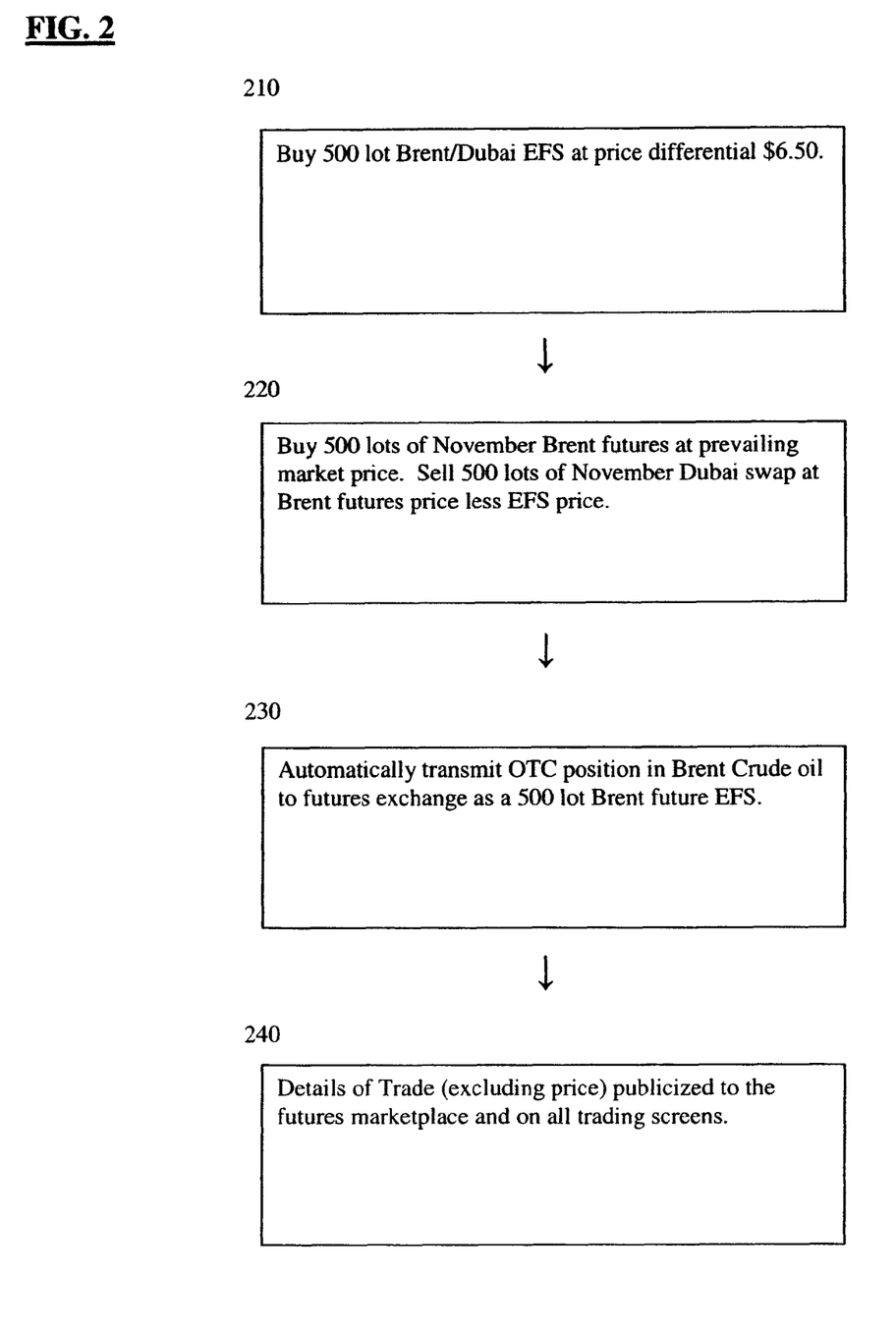
FIG. 2 is a flow chart of a method of the offsetting positions from a futures contract to an OTC position using the present invention.

The following example is explained with reference to FIG. 2. Assume Party A has an interest in the differential between the November contracts in a Dubai crude oil swap (a bilateral OTC contract) and a Brent crude oil future (a cleared futures contract). Assume he wants to be long 500 lots in the Brent futures contract and short 500 lots in the Dubai OTC swap contract. According to a preferred embodiment, Party A would access an electronic exchange such as that provided by ICE. The steps are:

In step 210, Party A buys a 500 lot November Brent/Dubai EFS on ICE at a price differential of $6.50. This means that he has sold 500 lots of the November Dubai OTC swap contract which is priced by reference to the prevailing price in the November Brent futures market, i.e., the Brent/Dubai EFS is priced with reference to the prevailing Brent futures market.

In step 220, Party A buys 500 lots of November Brent futures at the prevailing market price. If Brent futures were trading at the time of purchase at $63.50, he has sold the November Dubai OTC swap at $63.50 minus $6.50, or $57.00.

At the time of the transaction, Party A has really bought an OTC position in Brent crude oil. However, at the time of purchase, in step 230, this is immediately automatically transmitted to the futures exchange, e.g., ICE Futures, as an EFS and is registered onto the futures exchange as a 500 lot Brent future EFS which is then cleared by a clearing house having a clearing contract with the futures exchange.

In step 240, the details of the trade (excluding price) are publicized to the futures marketplace and on all trading screens. According to the preferred embodiment, because the OTC exchange is linked to the futures exchange, e.g., the ICE platform 110 takes a price feed from ICE Futures, the Brent futures EFS is not likely to be rejected by the futures exchange as it will not break price and quantity parameters set by the futures exchange.

Following the transaction, Party A has a bilateral Dubai OTC swap contract with a counterparty, Party B, as well as a cleared 500 lot Brent futures contract. On the other side, Party B will have bought the Dubai OTC swap contracts and sold the Brent futures contract.

EXAMPLE 2

Figure 4:
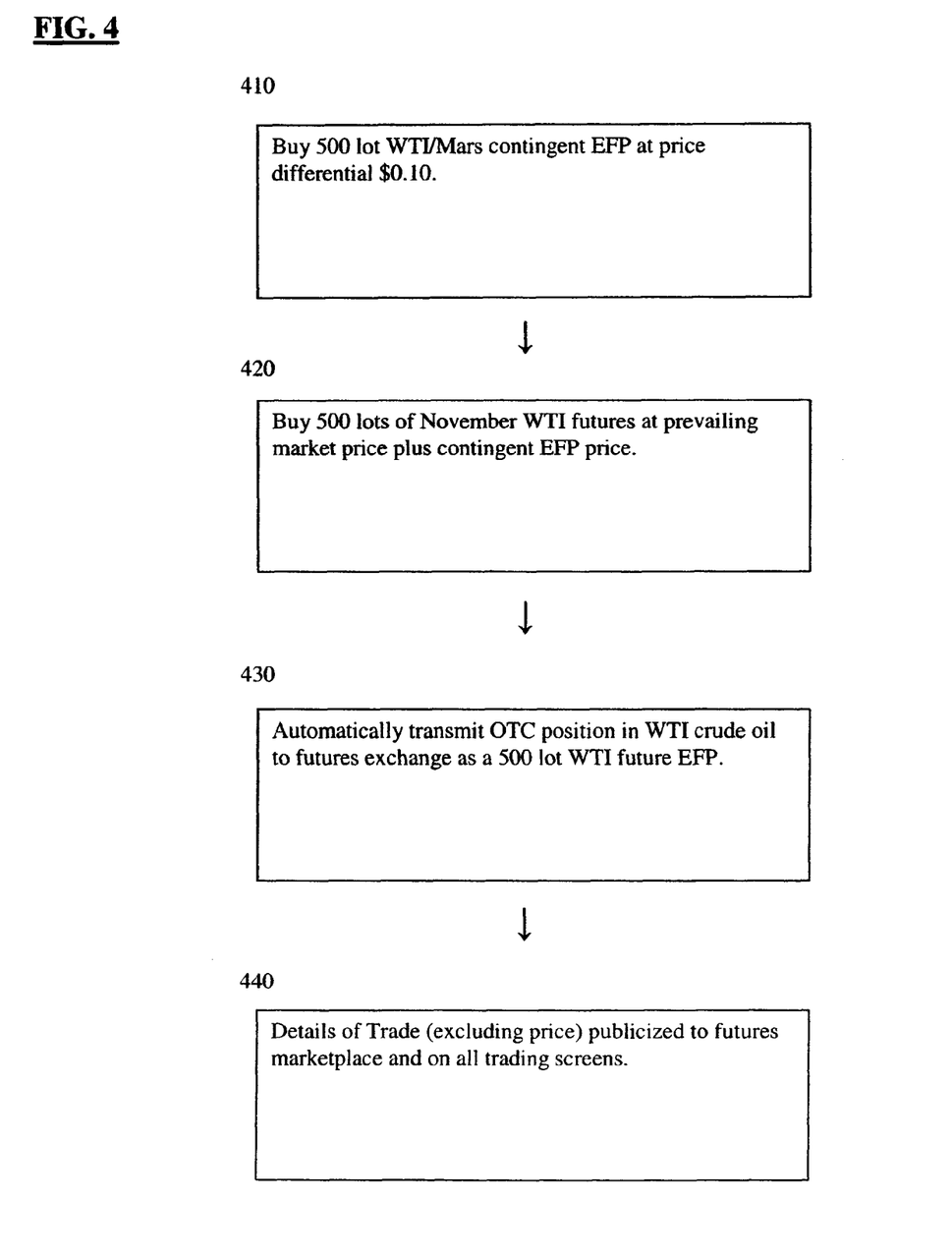
FIG. 4 is a flow chart of a method for carrying out a contingent offset position using the present invention.

The following example is explained with reference to FIG. 4. Assume Party A has an interest in the November Mars crude oil forward (a bilateral OTC contract). Assume he wants to be long 500 lots in the Mars crude oil forward, but is generally viewed as being of unacceptable credit worthiness by the available counterparties (e.g. buyers and sellers) in the OTC markets. Of the counterparties in the market, most are willing to execute a bilateral contract with Party A contingent upon it being exchanged for a November WTI futures contract. According to a preferred embodiment, Party A would access an electronic exchange such as that provided by ICE. The steps are:

In step 410, Party A buys a 500 lot November WTI/Mars Contingent EFP on ICE at a price differential of $0.10. This means that he has bought 500 lots of the November WTI futures contract which is priced by reference to the prevailing price in the November WTI futures market, i.e., the WTI/Mars Contingent EFP is priced with reference to the prevailing WTI futures market.

In step 420, Party A buys 500 lots of November WTI futures at the prevailing market price+$0.10. If WTI futures were trading at the time of purchase at $63.50, he has bought the November Mars OTC swap at $63.50 minus $0.50, or $63.40.

At the time of the transaction, Party A has really bought an OTC position in Mars crude oil. However, at the time of purchase, in step 430, this is immediately automatically transmitted to the futures exchange, e.g., ICE Futures, as an EFS and is registered onto the futures exchange as a 500 lot WTI future EFS which is then cleared by a clearing house having a clearing contract with the futures exchange.

In step 440, the details of the trade (excluding price) are publicized to the futures marketplace and on all trading screens. According to the preferred embodiment, because the OTC exchange is linked to the futures exchange, e.g., the ICE platform 110 takes a price feed from ICE Futures, the WTI futures EFS is not likely to be rejected by the futures exchange as it will not break price and quantity parameters set by the futures exchange.

Following the transaction, Party A has a cleared 500 lot WTI futures contract. Because the bilateral Mars OTC swap contract was contingent upon it being accepted by the futures exchange, there is no resulting OTC position with a counterparty, Party B, On the other side, Party B will have sold the WTI futures contract.

EXAMPLE 3

Figure 3:
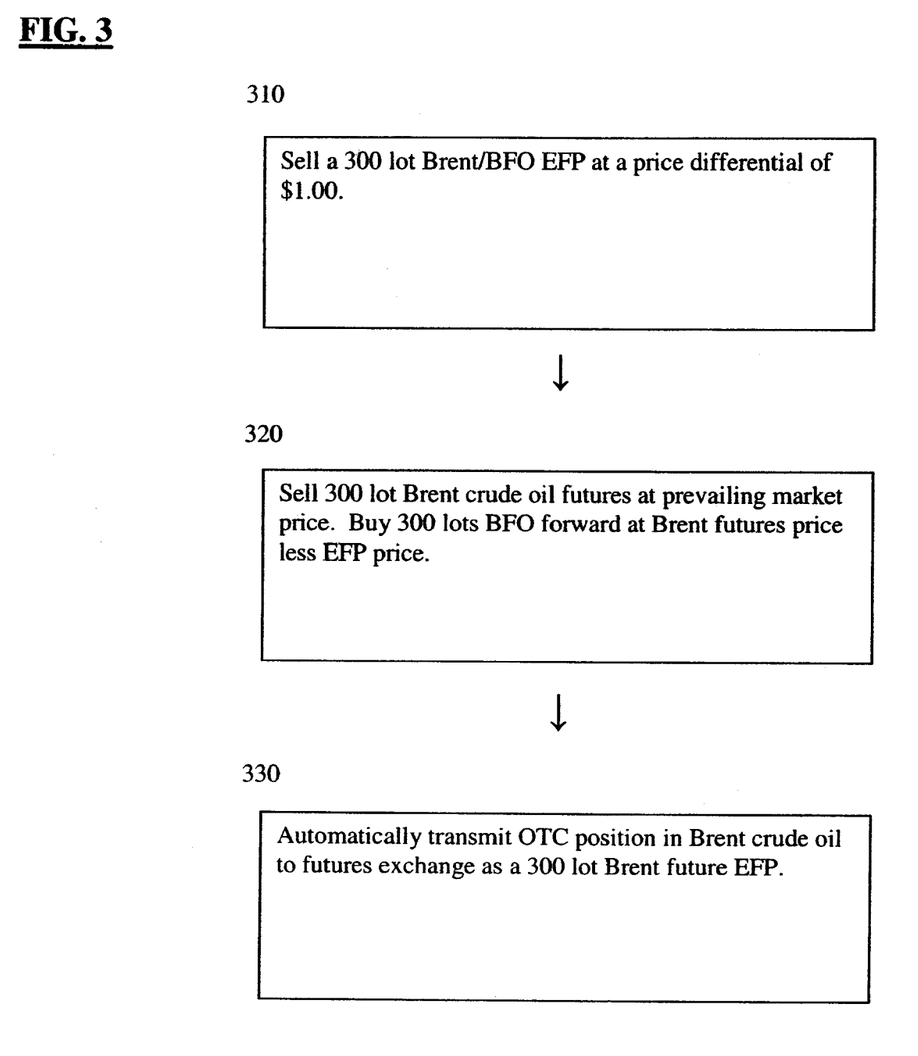
FIG. 3 is a flow chart of a method for offsetting positions from an OTC position to a futures contract using the present invention.

Assume a party maintains a long position in a December Brent crude oil future (a cleared futures contract) and wants to manage the commodity bilaterally during a delivery phase to make a profit (i.e., wants to be long in a similar bilateral OTC forward contract). Referring to FIG. 3, the steps are:

1. In step 310, party A sells a 300 lot Brent/BFO (or Brent, Forties and Oseburg Blend—the typical physically delivered crude oil grades in the North Sea) EFP on the ICE platform at a price differential of $1.00. This means that he has sold a Brent crude oil future and correspondingly purchased a BFO Blend crude oil OTC forward contract at a price differential between the two commodities. The sale of the Brent future is automatically registered on the future exchange when the OTC forward purchase occurs.

2. In step 320, party A sells a December Brent crude oil futures contract at the prevailing market price. If Brent futures were trading at the time of purchase at $63.50, he has bought the BFO OTC forward at $63.50 minus $1.00, or $62.50.

At the time of the transaction, Party A has really sold an OTC position in Brent crude oil. However, at the time of sale, in step 330, this is immediately automatically transmitted to the futures exchange, e.g., ICE Futures, as an EFP and is registered onto the futures exchange as a 300 lot Brent future EFP which is then cleared by a clearing house having a clearing contract with the futures exchange.

Following the transaction, Party A has a bilateral BFO OTC forward contract with a counterparty, Party B, as well as an offset of 300 lot of the Brent futures contract for his existing futures position. On the other side, Party B will have sold the BFO OTC forward contract and bought the Brent futures contract.

It will be seen in that in the above Example 2, a futures contract is offset and reestablished as an OTC position.

Because the EFP/EFS is only traded at a differential, it is linked to a futures anchor price, which is the then-existing market clearing price for the future and the EFP/EFS does not negatively affect price discovery on the futures market. Moreover, at the point of execution, although the two markets (OTC and futures) are linked, the product is an OTC product and is only registered automatically on the futures market to show that a trade has occurred and that a futures position has been created. Thus, disclosure is made in the futures market without affecting the price of that market. Additionally, because the counterparties preferably consummate the OTC leg of the trade electronically, their identities are known to the exchanges and readily reportable for documentation purposes.

Aside from the above presented examples, other bilateral and cleared contracts can be traded as an EFS or EFP. Where the underlying commodity type is energy, the related first and second commodities may be, for example: natural resources or related natural resource instruments, such as, crude oil, refined crude oil products, natural gas, electricity, emissions, coal, liquid natural gas, natural gas liquids, weather, bio fuels, nuclear, fuel, petrochemicals, hydroelectric energy generation, solar energy generation, wind energy generation, and others. For oil, the related first and second commodity may be, for example: oil futures, oil forwards, oil options (European, American, Asian style), oil swaptions, rolling date forwards, contracts for difference, front line swaps, fixed for floating swaps, float for float swaps, index swaps, and others. Other commodity types may include precious metals, base metals, currency, agricultural commodities, fixed income financial futures, and others.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method of offset or contingent trading comprising:
   offering for sale or purchase a first financial derivatives contract on a first exchange;

offering for purchase or sale a second financial derivatives contract on a second exchange;

consummating one of an offsetting and contingent trading transaction for the second financial derivatives contract at a price differential that is based on prevailing market prices as indicated by the first exchange; and automatically registering via an electronic computing device in communication with said first and second exchanges, a trade for the first financial derivatives contract on the first exchange upon a trade of the second financial derivatives commodity contract.

2. The method of claim 1, wherein the first financial derivatives contract corresponds to the consummated trading transaction.

3. The method of claim 2, wherein the one of an offsetting and contingent trading transaction is one of an exchange for physical (EFP) and exchange for swap (EFS) transaction.

4. The method of claim 3, further comprising publicizing details of the trade for the first derivatives contract to marketplace participants of the first exchange.

5. The method of claim 4, wherein the first exchange is a futures exchange.

6. The method of claim 5, wherein the second financial derivatives contract is an over-the-counter (OTC) bilateral contract, and wherein the second exchange is an OTC exchange.

7. The method of claim 6, wherein the OTC bilateral contract is one of a swap, forward and options contract.

8. The method of claim 7, wherein the first financial derivative contract is for a first commodity of a commodity type and wherein the second financial derivative contract is for a different commodity of said commodity type.

9. The method of claim 8, wherein the commodity type is one of energy, oil, precious metals, base metals, currency, agricultural commodities, and fixed income financial futures.

10. The method of claim 9, wherein the commodity type is energy and wherein the first and different commodities are selected from the group consisting of natural gas, crude oil, refined crude oil products, electricity, emissions, coal, liquid natural gas, natural gas liquids, weather, bio fuels, nuclear fuel, petrochemicals, hydroelectric energy generation, solar energy generation, and wind energy generation.

11. The method of claim 9, wherein the commodity type is oil and wherein the first and different commodities are selected from the group consisting of oil futures, oil forwards, oil options, oil swaptions, rolling date forwards, contracts-for-difference, front line swaps, fixed-for-floating swaps, float-for-float swaps, and index swaps.

12. A system for offset and contingent trading in an electronic trading environment, the system comprising:

an electronic computing device;

two or more exchanges in communication with the electronic computing device, the exchanges providing price feeds and reporting trades to the electronic computing device; and one or more user terminals in communication with the electronic computing device, the user terminals providing access to the price feeds and trades reported to the electronic computing device, wherein the electronic computing device is configured to automatically transmit a first trade for registration on a first of the exchanges in response to a second trade occurring on a second of the two or more exchanges, and wherein the second trade is consummated at a price differential that is based on prevailing market prices as indicated by the first exchange.

13. The system of claim 12, wherein the electronic computing device is further configured to: consummate one of an offsetting and contingent trading transaction by offering for sale or purchase a first financial derivatives contract on the first exchange; offer for purchase or sale a second financial derivatives contract on the second exchange; and automatically register a trade of the first financial derivatives contract on the first exchange upon a trade of the second financial derivatives commodity contract.

14. The system of claim 13, wherein the first exchange is a futures exchange, wherein the second exchange is an over-the-counter (OTC) exchange, and wherein the electronic computing device is configured to move a bilateral OTC contract into a cleared position upon consummating one of an offsetting and contingent trading transaction.

15. The system of claim 14, wherein the electronic computing device is further configured to move a cleared contract into a bilateral OTC position upon consummating one of an offsetting and contingent trading transaction.

16. The system of claim 15, wherein the electronic computing device is further configured to simultaneously initiate a position in both a bilateral OTC contract and a cleared contract upon consummating one of an offsetting and contingent trading transaction.

17. The system of claim 16, wherein the first financial derivatives contract is one of a futures and options contract, and wherein the second financial derivatives contract is an over-the-counter (OTC) bilateral contract.

18. The system of claim 17, wherein the OTC bilateral contract is one of a swap, forward and options contract.

19. The system of claim 18, wherein the first and second financial derivatives contracts are based on one of commodities, natural resources, and financial instruments.

20. The system of claim 19, wherein the first financial derivative contract is for a first commodity of a commodity type and wherein the second financial derivative contract is for a different commodity of said commodity type.

21. The system of claim 20, wherein the commodity type is one of oil, natural gas, and energy.

* * * * *

UNITED STATES PATENT AND TRADEMARK OFFICE
CERTIFICATE OF CORRECTION

| | | |
|---|---|---|
| PATENT NO. | : 7,831,502 B2 | Page 1 of 1 |
| APPLICATION NO. | : 11/877746 | |
| DATED | : November 9, 2010 | |
| INVENTOR(S) | : Cummings et al. | |

It is certified that error appears in the above-identified patent and that said Letters Patent is hereby corrected as shown below:

In the Claims

<u>Column 7</u>

Line 11, delete "commodity".

Signed and Sealed this
Third Day of February, 2015

Michelle K. Lee
*Deputy Director of the United States Patent and Trademark Office*